April 15, 1941.  W. O. SCHULTZ  2,238,755
CABLE-ANCHORING DEVICE
Original Filed April 28, 1937  2 Sheets-Sheet 1

INVENTOR.
William O. Schultz
BY Chester W. Brown
ATTORNEY.

April 15, 1941.　　　W. O. SCHULTZ　　　2,238,755
CABLE-ANCHORING DEVICE
Original Filed April 28, 1937　　2 Sheets—Sheet 2
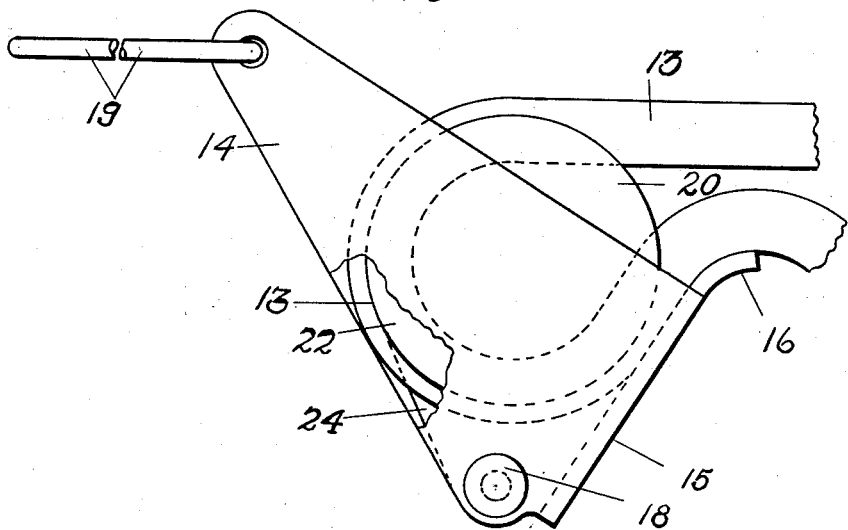
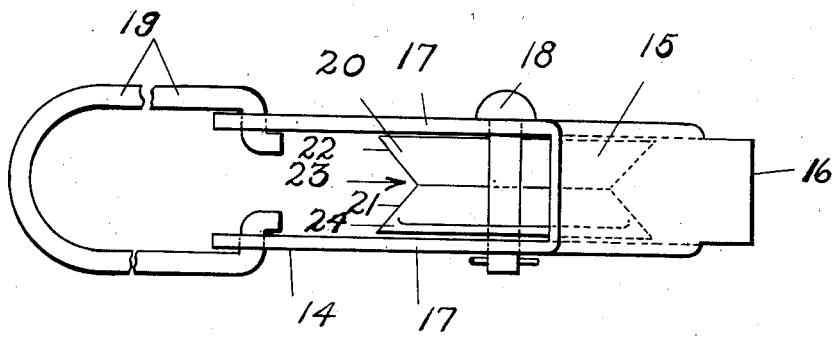

Patented Apr. 15, 1941

2,238,755

UNITED STATES PATENT OFFICE 2,238,755

CABLE-ANCHORING DEVICE

William O. Schultz, South Milwaukee, Wis., assignor to Line Material Company, South Milwaukee, Wis., a corporation of Delaware Original application April 28, 1937, Serial No. 139,485. Divided and this application November 13, 1939, Serial No. 304,103

6 Claims. (Cl. 24—134)

This invention relates to improvements in cable-anchoring devices.

This application is a division of my application filed April 28, 1937, Serial No. 139,485 now Patent No. 2,203,066, granted June 4, 1940, for Cable anchoring devices, the device illustrated in the drawings and described hereafter being substantially identical to that illustrated in Figs. 5 to 10, inclusive, of said application filed April 28, 1937.

As in my application filed April 28, 1937, it is an object of this invention to provide a cable-anchoring device having a freely movable clamping member adapted to act as a snubbing element and to be actuated by the cable into clamping engagement therewith.

A further object is to provide in a cable-anchoring device, a snubbing and clamping member which is movable relative to its coacting supporting element to a position permitting the cable to be looped about the member without interference by the supporting element and which may then be replaced in operative snubbing and clamping relation to the supporting element which serves as means for preventing disengagement of the cable laterally of the device.

It is also an object to provide a cable clamp which will permit the cable to be first formed into a loop at its anchoring end and then passed through an aperture in the device, the loop then receiving a snubbing and clamping member which will prevent removal of the loop from the aperture and automatically clamp the cable to the device under the influence of weight or tension of the cable.

Further objects are to provide in a cable-anchoring device with parallel sides, a circular snubbing element pivotally cooperative with said sides and wholly removable therefrom and which may be replaced to operative and clamping position with relation to said sides for clamping a cable thereto.

The following description will disclose a cable-anchoring device from which a cable may be easily removed without mutilating the cable or the device and from which the cable may be easily released after shifting the stresses produced by the cable from the device.

In the drawings:

Fig. 5 is a view illustrating a modified form of snubbing and clamping element.

Fig. 6 is a bottom plan view of the device shown in Fig. 5.

Like parts are identified by the same reference characters throughout the several views.

Figure 1:
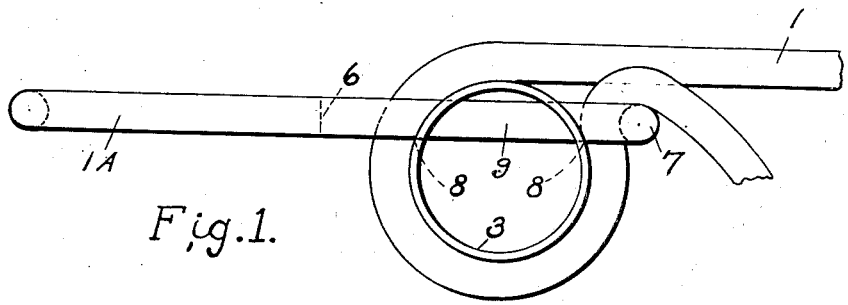
Fig. 1 is a side view in elevation of this invention.
Figure 2:
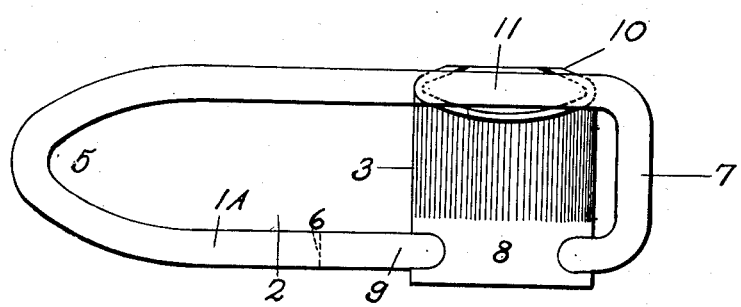
Fig. 2 is a top plan view of the device.
Figure 3:
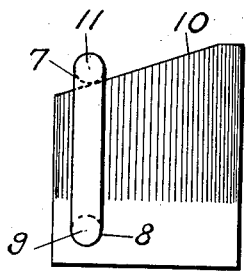
Fig. 3 is a right-end view of the device shown in Fig. 1.

The device shown in Figs. 1, 2 and 3 comprises an elongated, generally rectangularly-shaped slide member 1A providing an elongated opening 2 for receiving the looped end of a cable 1 and within which the snubbing and tubular clamping member 3 is movable. The member 1A is preferably formed of round stock and may be reinforced by a cross-bar if desired at the bail end 5. After the rod has been bent to the shape indicated, the ends are brought together at 6 and welded. The end 7 of the member 1A serves as a clamping portion cooperating with the element 3 to prevent slipping of a cable about the element when anchored thereto. When the element 3 is disposed between the sides 9 and 11, the axis about which the element 3 is generated extends transversely to the sides 9 and 11.

As clearly shown in Fig. 1, the element 3 is preferably made of tubing and is provided at one end with a pair of concentric apertures 8, the axes of which are transversely extended relative to the axis of the tube and are laterally to one side of the tube axis. These apertures receive one side 9 of the member 1A. The opposite end 10 of the member 3 is cut at a bevel and serves as a contact margin engaging the side 11 of the member 1A and preventing the pivotal movement of the element 3 in one direction but permitting it in the other direction.

From the foregoing, it will be seen that in the device shown in Figs. 1 through 3, the element 3 (shown in Fig. 4 as element 3A) is capable of being moved in two general directions relative to the slide member and transversely in a plane normal to longitudinal direction of movement or to the slide member.

A cable 1 is anchored to the device disclosed in Figs. 1, 2 and 3 as follows, reference being made specifically to Fig. 1: The cable 1 is formed into a loop which is passed through the opening 2 after withdrawing the element 3 from the opening by pivotal movement downwardly about the side 9 of the member 1A. When the loop is passed through the opening, the element 3 is moved into the loop so that the cable passes beneath the element and upwardly between the element 3 and the clamping portion 7 on the member 1A.

As clearly indicated in Fig. 1, the main portion of the element 3 is disposed below the member 1A so that it will be drawn upwardly with its angular margin 10 engaging the side 11 of the member 1A. Obviously, if the cable is under tension, it will cause the element 3 to slide toward the clamping portion 7 and securely hold the cable against withdrawal.

Figure 4:
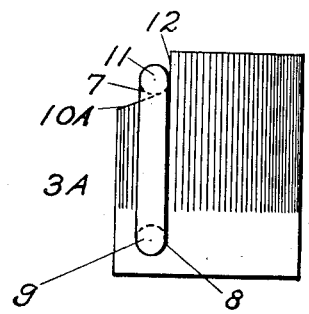
Fig. 4 is a view similar to Fig. 3 illustrating a modified form of snubbing and clamping element.

The snubbing and clamping element 3A shown in Fig. 4 is a modification of that shown in Figs. 1 and 2 in that the beveled margin 10A terminates in a shoulder 12 which engages the side 11 of the member 1 and minimizes any tendency to spread the sides of the member. Otherwise the device illustrated in Fig. 4 operates the same as that described with reference to Figs. 1, 2 and 3.

Figs. 5 and 6 illustrate a cable-anchoring device comprising a U-shaped pivot support 14 formed of sheet metal bent to provide an intermediate portion 15 having an arcuate tongue-like projection 16 and to provide a pair of triangularly-shaped arms 17, each having adjacent the lower end of the portion 15, an aperture receiving a pivot pin 18 and having at the upper end an aperture receiving one end of the bail 19. Pivotally mounted on the pin 18 is a circular snubbing and clamping element 20. This element comprises a pair of discs 21 and 22 (Fig. 6) having their respective peripheries beveled inwardly to provide an annular snubbing groove 23 for receiving the looped end of the cable 13. These discs may be secured together in any well-known manner, not shown. As clearly illustrated, the disc 21 has a depending pivot arm 24 which is pivoted on the pin 18 and supports the element 20 as a whole.

The device illustrated in the drawings operates as follows: When it is desired to engage a cable with the device, the element 20 will be moved about the pin 18 until it depends downwardly with reference to Fig. 5 and the looped end of the cable 13 will be passed between the arms 17 from above until it extends a sufficient distance below the arm to permit insertion of the element 20 within the loop and disposing the loop in the annular groove 23.

After the cable has thus been engaged with the element 20, it will be pulled back between the arms 17, thereby carrying with it the element 20. Continued movement as described will cause the element 20 to force the cable into clamping engagement with the portion 15 and tongue 16. Obviously, when the bail 19 is secured to a support, the tension of the cable will hold it securely anchored to the device.

From the foregoing disclosure, it will be apparent that a cable-anchoring device has been provided in which a combined snubbing and clamping action is secured by means of a single element movably supported upon a clamping member, that a device has been provided in which tension upon a cable is utilized to cause clamping engagement therewith, that a device has been provided in which the movable snubbing and clamping element may be moved to a position relative to its support permitting the looped end of a cable to be passed through the support and engaged with the element for movement therewith to clamping engagement with the support, and that a single, comparatively inexpensive and efficient device has been provided which comprises a minimum number of easily manipulated parts.

I claim:

1. In a cable-anchoring device, a yoke member having spaced substantially parallel sides, of a circular snubbing element pivotally and slidably mounted on one of said sides for movement thereon to positions between said sides and wholly removed therefrom alternatively, said yoke member having a clamping portion connecting said sides and cooperative with the periphery of the snubbing element to clamp a tensioned cable thereto, the pivotal movement of said element being about an axis substantially parallel relative to said sides.

2. In a cable-anchoring device, a pivot support having spaced substantially parallel sides the corresponding ends of said sides being integrally connected to provide a clamping portion at one end and a bail portion at the other end, in combination with a snubbing element having a circular snubbing surface cooperative with said clamping portion for clamping a cable thereto and normally positioned between said sides, said snubbing element including a portion pivotally supporting said element from one of said sides for movement in an arcuate direction thereabout to a position in which the snubbing surface is removed in its entirety from between said sides, whereby a looped cable portion may be passed between said sides and said snubbing surface passed through said loop prior to the return of the snubbing surface to a position between said sides.

3. In a cable-anchoring device, the combination with a substantially rectangular slide member having spaced parallel sides terminating at one end in a bail portion and at the other end in a clamping portion, of a circular snubbing element having its axis transversely related to said sides when operatively engaged with a cable, said element being pivotally mounted for movement in an arcuate direction about one of said sides and slidably mounted for movement longitudinally on said one of said sides and provided with a shouldered portion engageable with the other of said sides to limit pivotal movement of said element in one direction.

4. In a cable-anchoring device, the combination with a U-shaped member having a pair of arms and a clamping portion connecting said arms, of a snubbing element provided with an arcuate snub groove and positioned between said arms, said element being pivotally mounted on said member at a point radially remote from the axis of said groove and from said groove and in a direction axially offset from said groove for movement toward said clamping portion, and a bail secured to said member remote from said clamping portion.

5. In a cable-anchoring device, the combination with a slide member having substantially spaced parallel sides closed at each end, a snubbing element pivotally and slidably mounted on one of said sides and provided with a shouldered portion engageable with the other of said sides to limit pivotal movement of said element in one direction.

6. A cable anchoring device comprising a member having substantially parallel sides integrally joined at corresponding ends to provide a snubbing portion, and a snubbing element having a cylindrical snubbing surface and a pivot portion offset radially of the axis of and laterally of said snubbing surface, said pivot portion being pivotally connected with one side only of said member, said snubbing surface being normally disposed between said sides for cooperation with said snubbing portion and movable about said pivot to a position disposing said snubbing surface with its entire cylindrical snubbing surface wholly removed from between said sides, whereby a looped end of a cable may be passed between said sides and said cylindrical snubbing surface disposed within said loop.

WILLIAM O. SCHULTZ.